United States Patent
Oyama et al.

(10) Patent No.: US 11,486,168 B2
(45) Date of Patent: Nov. 1, 2022

(54) ACTUATION CABLE DEVICE

(71) Applicants: Shunsuke Oyama, Toyota (JP); Hidenori Tokimasa, Takarazuka (JP); Atsushi Nishimura, Takarazuka (JP); Ritsu Sano, Takarazuka (JP)

(72) Inventors: Shunsuke Oyama, Toyota (JP); Hidenori Tokimasa, Takarazuka (JP); Atsushi Nishimura, Takarazuka (JP); Ritsu Sano, Takarazuka (JP)

(73) Assignees: TOYOTA JIDOSHA KABUSHIKI KAISHA, Toyota (JP); HI-LEX CORPORATION, Takarazuka (JP)

( * ) Notice: Subject to any disclaimer, the term of this patent is extended or adjusted under 35 U.S.C. 154(b) by 0 days.

(21) Appl. No.: 17/142,589

(22) Filed: Jan. 6, 2021

(65) Prior Publication Data
US 2021/0207410 A1    Jul. 8, 2021

(30) Foreign Application Priority Data
Jan. 8, 2020    (JP) .............................. JP2020-001532

(51) Int. Cl.
*F16C 1/12*    (2006.01)
*E05B 79/20*    (2014.01)
(Continued)

(52) U.S. Cl.
CPC ............ *E05B 79/20* (2013.01); *E05B 83/247* (2013.01); *F16C 1/12* (2013.01); *E05B 53/005* (2013.01);
(Continued)

(58) Field of Classification Search
CPC .......... E05B 53/005; E05B 79/20; F16C 1/12; F16C 1/106; F16C 1/18
See application file for complete search history.

(56) References Cited

U.S. PATENT DOCUMENTS

| 6,942,258 B2 * | 9/2005 | Roos ....................... E05B 77/26 |
| | | 292/216 |
| 2009/0193922 A1 * | 8/2009 | Hayashi .................... F16C 1/12 |
| | | 74/473.15 |

(Continued)

FOREIGN PATENT DOCUMENTS

| CN | 104554469 A | 4/2015 |
| DE | 102007027753 A1 * | 12/2008 ................ F16C 1/12 |

(Continued)

OTHER PUBLICATIONS

Machine Translation of JP 2020-133255, obtained Mar. 1, 2022.*
Machine Translation of DE 10 2007 027 753.*

*Primary Examiner* — Richard W Ridley
*Assistant Examiner* — Brian J McGovern
(74) *Attorney, Agent, or Firm* — Dinsmore & Shohl LLP

(57) ABSTRACT

An actuation cable device includes a left hood lock cable having an end connected to a left hood lock device; a right hood lock cable having an end connected to a right hood lock device; an opener cable having an end connected to a hood opener; and a link device including a rotatable link member to which second ends of the above-described cables are connected. The left hood lock cable and the right hood lock cable are respectively connected to an upper portion and a lower portion of the link member in a manner so that they extend from the link member toward opposite sides to each other. The opener cable is connected to the upper portion in a manner so that it extends from the link member toward an opposite side to the side toward which the left hood lock cable extends.

1 Claim, 6 Drawing Sheets

(51) Int. Cl.
*E05B 83/24* (2014.01)
*F16C 1/18* (2006.01)
*F16C 1/10* (2006.01)
*E05B 53/00* (2006.01)

(52) U.S. Cl.
CPC ............... *F16C 1/10* (2013.01); *F16C 1/106* (2013.01); *F16C 1/18* (2013.01); *F16C 2350/52* (2013.01)

(56) References Cited

U.S. PATENT DOCUMENTS

| | | | |
|---|---|---|---|
| 2009/0247364 A1* | 10/2009 | Sano | B60T 13/746 477/197 |
| 2017/0198744 A1* | 7/2017 | Sano | F16B 7/20 |
| 2019/0225118 A1* | 7/2019 | Tindall | B60N 2/067 |
| 2020/0001742 A1* | 1/2020 | Epaud | B60N 2/10 |
| 2020/0262279 A1* | 8/2020 | Hirozawa | B60R 25/24 |

FOREIGN PATENT DOCUMENTS

| | | | | |
|---|---|---|---|---|
| DE | 102008034770 A1 | | 2/2010 | |
| JP | 2020133255 A | * | 8/2020 | ............ B60J 5/0472 |

\* cited by examiner

ACTUATION CABLE DEVICE

CROSS REFERENCE TO RELATED APPLICATION

This application claims priority to Japanese Patent Application No. 2020-1532 filed on Jan. 8, 2020, which is incorporated herein by reference in its entirety including the specification, claims, drawings, and abstract.

TECHNICAL FIELD

The present disclosure relates to an actuation cable device for actuating two devices, such as two hood lock devices, in conjunction with an operation of an operation device, such as a hood opener.

BACKGROUND

DE 102008034770 A1 discloses an actuation cable device that includes a first cable and a second cable each having a first end that is connected to a corresponding one of a first device and a second device, such as two hood lock devices; a third cable having a first end that is connected to an operation device, such as a hood opener; and a pulley to which second ends of these three cables are connected. In this actuation cable device, an operation of the operation device causes the third cable to be pulled and drawn out from the pulley, and causes the pulley to rotate. As the pulley rotates, the first cable and the second cable are wound around the pulley, and as the first device and the second device are pulled, the first device and the second device are actuated. After the operation of the operation device ends, the third cable returns to the pre-operation state and is again wound around the pulley.

SUMMARY

In the actuation cable device disclosed in DE 102008034770 A1, the three cables are wound around the pulley each time a series of operations is performed from a start of the operation of the operation device until the operation ends. In this structure, an attempt to downsize the actuation cable device by reducing the diameter of the pulley would result in a reduction in durability performance of the cables, as the cables are curved around a smaller circumference when they are wound around the pulley. To avoid such a reduction in durability performance, the pulley should have a larger diameter, which inevitably leads to upsizing of the actuation cable device disclosed in DE 102008034770 A1.

The present disclosure is directed toward avoiding upsizing of the actuation cable device.

According to an aspect of the present disclosure, there is provided an actuation cable device for actuating a first device and a second device of a vehicle in conjunction with an operation of an operation device of the vehicle, the actuation cable device comprising a first cable having a first end that is connected to the first device; a second cable having a first end that is connected to the second device; a third cable having a first end that is connected to the operation device; and a link member that is rotatable about a rotary axis set at a center portion, wherein the first cable has a second end connected to a first portion of the link member that is located closer to a first-end side of the link member than the rotary axis, wherein the second cable has a second end connected to a second portion of the link member that is located closer to a second-end side of the link member than the rotary axis, the second portion being located opposite the first portion with the rotary axis therebetween, wherein the first cable and the second cable extend from the link member toward opposite sides to each other, wherein the third cable has a second end connected to a third portion of the link member that is located closer to the first-end side of the link member than the rotary axis, and wherein the third cable extends from the link member toward an opposite side to the side toward which the first cable extends.

The actuation cable device according to the present disclosure eliminates the necessity for a pulley and precludes upsizing of the device.

BRIEF DESCRIPTION OF DRAWINGS

Embodiments of the present disclosure will be described based on the following figures, wherein.

DESCRIPTION OF EMBODIMENTS

Figure 1:
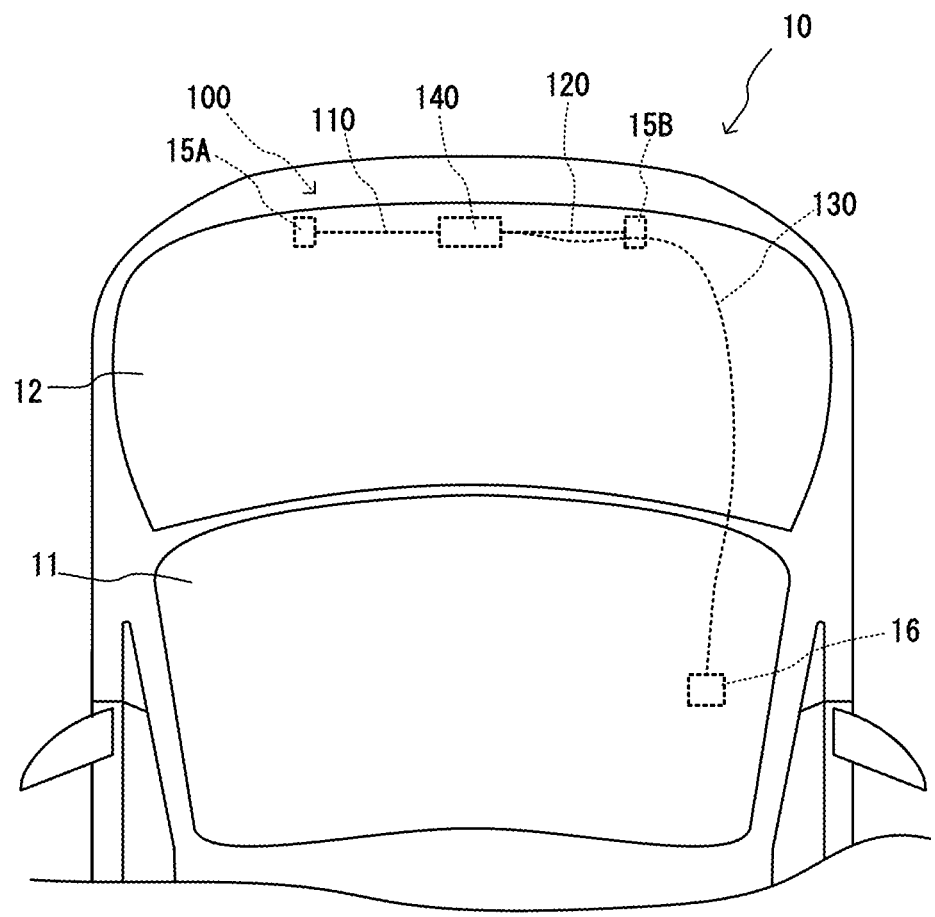
FIG. 1 is a schematic plan view illustrating a front portion of a vehicle that includes an actuation cable device according to an embodiment.

An actuation cable device 100 according to an embodiment of the present disclosure will be described below with reference to the accompanying drawings. As illustrated in FIG. 1, the actuation cable device 100 is mounted on a vehicle 10. The illustrated vehicle 10 is a right-hand drive vehicle. The following description first describes a structure of the vehicle 10, and then describes a structure of the actuation cable device 100.

Arrows FR, UP, and RH in the drawings respectively indicate directions toward the front toward which the vehicle 10 normally travels, upward, and toward the right with respect to the vehicle 10. Directions opposite the arrows FR, UP, and RH respectively represent directions toward the rear, downward, and toward the left with respect to the vehicle 10. In the following description, unless otherwise specified, the terms front/rear, right/left, and up/down respectively represent directions toward the front/rear in the front/rear direction with respect to the vehicle 10, right/left in the right/left direction with respect to the vehicle 10, and up/down in the up/down direction with respect to the vehicle 10. The right/left direction may also be referred to as a width direction with respect to the vehicle 10.

Structure of the Vehicle 10

As illustrated in FIG. 1, frontward of a front glass 11, the vehicle 10 includes an openable engine hood 12 that covers an engine compartment of the vehicle 10. The vehicle 10 includes a left hood lock device 15A and a right hood lock device 15B serving as devices for opening and closing the engine hood 12 together with the actuation cable device 100, and a hood opener 16 serving as an operation device.

The left hood lock device 15A and the right hood lock device 15B are spaced apart from each other in the right/left direction, and lock the engine hood 12 in a closed state. The locking of the engine hood 12 in a closed state may also be referred to as a hood lock.

The hood opener 16 is operated by, for example, a driver when a hood lock is to be released. The hood opener 16 is disposed below a steering wheel, which is not illustrated, on the right-hand side of the vehicle 10. The hood opener 16 is an operation device that includes a lever and is operated by a pulling operation in which the lever is pulled.

Structure of the Actuation Cable Device 100

Figure 2:
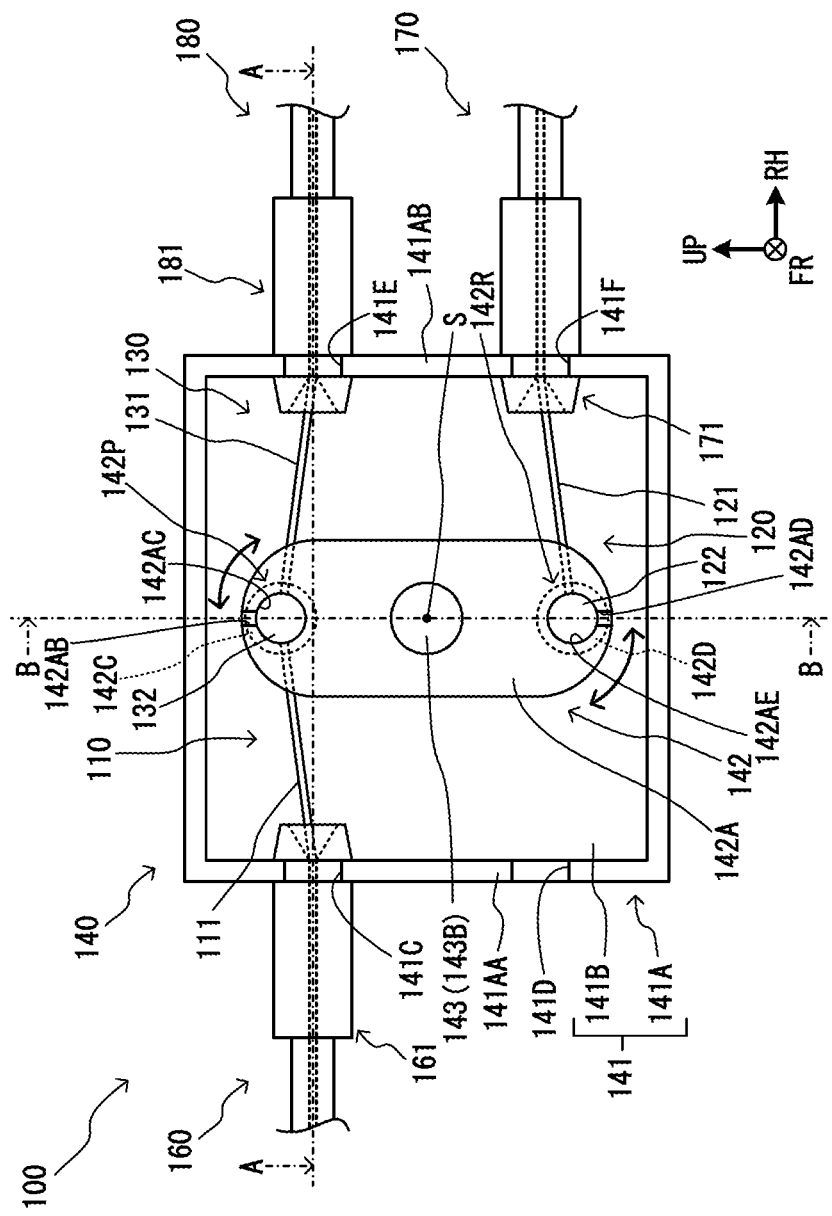
FIG. 2 is an elevation view illustrating a link device and its vicinity of the actuation cable device illustrated in FIG. 1 as viewed from the rear.

The actuation cable device 100 is a device for actuating the left hood lock device 15A and the right hood lock device 15B in conjunction with a pulling operation of the hood opener 16 to release a hood lock. As illustrated in FIGS. 1 and 2, the actuation cable device 100 includes a left hood lock cable 110, a right hood lock cable 120, an opener cable 130, and a link device 140 that includes a rotatable link member 142. The actuation cable device 100 further includes outer tubes 160, 170, and 180, which are illustrated in FIGS. 2 and 3.

Each of the cables 110, 120, and 130 movably passes through a corresponding one of the outer tubes 160, 170, and 180, which are hollow, with at least both ends of each of the cables 110, 120, and 130 being exposed, and each of the cables 110, 120, and 130 is held in a predetermined position by a corresponding one of the outer tubes 160, 170, and 180. The outer tube 180, through which the opener cable 130 passes, has a halfway portion held by the right hood lock device 15B and, from here, is led to the hood opener 16.

As illustrated in FIG. 1, a first end of the left hood lock cable 110, a first end of the right hood lock cable 120, and a first end of the opener cable 130 are respectively connected to the left hood lock device 15A, the right hood lock device 15B, and the hood opener 16. Second ends of the cables 110, 120, and 130 are connected to the link member 142 of the link device 140. In response to a pulling operation of the hood opener 16, the opener cable 130 is pulled, and via the link member 142 of the link device 140, the left hood lock cable 110 and the right hood lock cable 120 are also pulled. As a result, the left hood lock device 15A and the right hood lock device 15B are actuated to release a hood lock.

Figure 3:
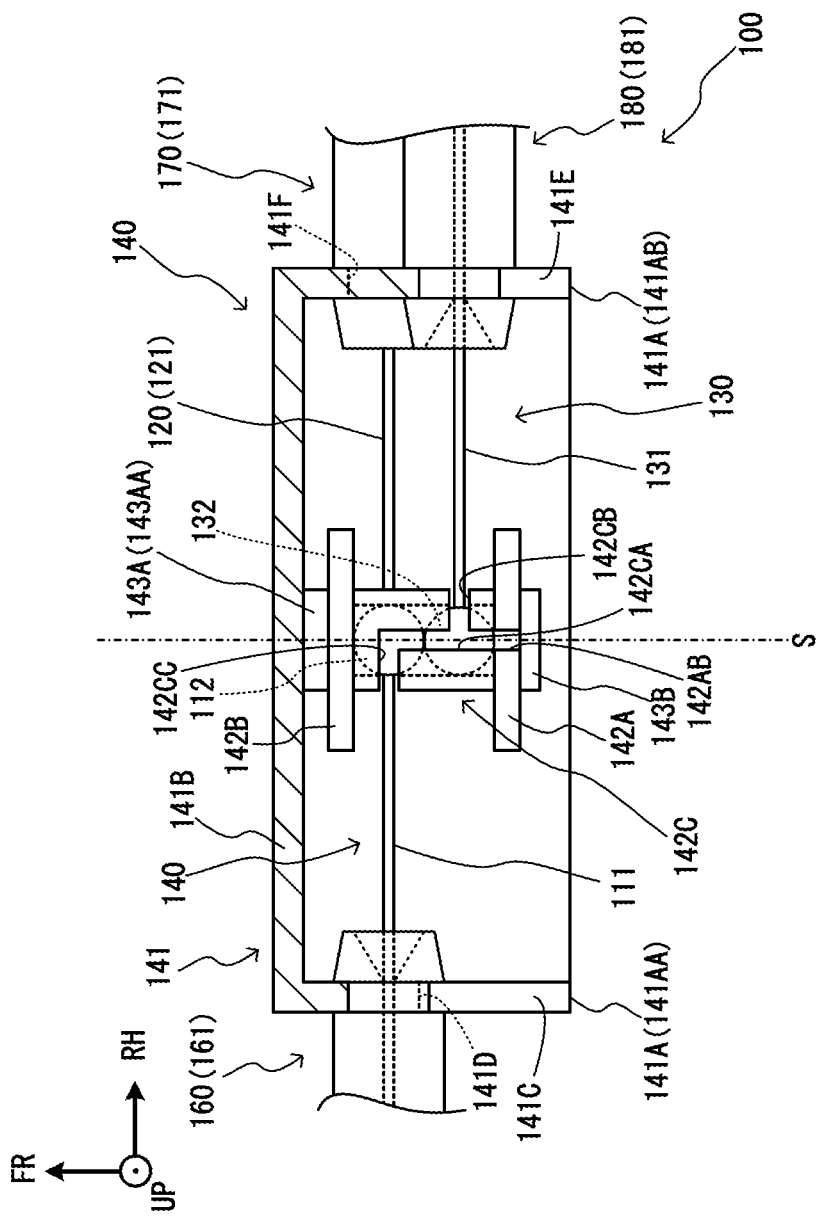
FIG. 3 is a plan view illustrating a structure inside the link device with a housing having a portion removed along line A-A in FIG. 2.
Figure 4:
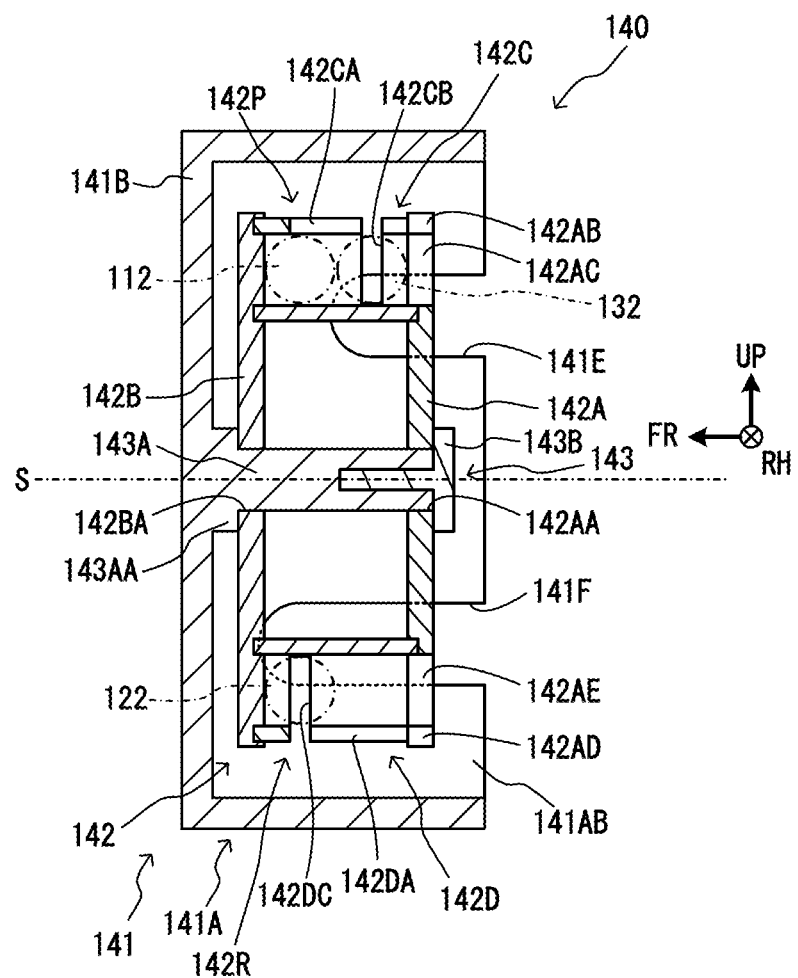
FIG. 4 is a cross-sectional view taken along line B-B in FIG. 2, in which cables and outer tubes are not illustrated.

As illustrated in FIGS. 2 to 4, the left hood lock cable 110 includes, in addition to a cable main component 111 that is flexible and in a linear shape, a ball 112 at its second end. The ball 112 is fixed to a second end of the cable main component 111. Similarly, the right hood lock cable 120 includes a cable main component 121 and a ball 122, and the opener cable 130 includes a cable main component 131 and a ball 132. Each of the second ends of the cables 110, 120, and 130 are connected to the link member 142 via a corresponding one of the balls 112, 122, and 132.

As illustrated in FIG. 1, the link device 140 is located between the left hood lock device 15A and the right hood lock device 15B, and links movements of the cables 110, 120, and 130 via the link member 142. As illustrated in FIGS. 2 to 4, the link device 140 includes a housing 141 that is shaped like a box that is open on the rear side, the link member 142, and a support 143 that supports the link member 142 rotatably about a rotary axis S. The rotary axis S extends in the front/rear direction through a center of the link member 142.

The housing 141 includes a side wall 141A and a bottom 141B. The side wall 141A has four cuts 141C, 141D, 141E, and 141F that extend from the rear end toward the front for insertion of the outer tubes 160, 170, and 180 into the link device 140. The bottom 141B has the support 143 thereon.

The side wall 141A includes a left wall 141AA that has the cuts 141C and 141D, and a right wall 141AB that is opposite the left wall 141AA and has the cut 141E and 141F. As illustrated in FIG. 2, the cut 141C and the cut 141E are located opposite each other at positions above the rotary axis S as viewed in the direction along the rotary axis S. Similarly, the cut 141D and the cut 141F are located opposite each other at positions below the rotary axis S.

The cuts 141C, 141E, and 141F respectively have fitted therein a connection end 161 of the outer tube 160, a connection end 181 of the outer tube 180, and a connection end 171 of the outer tube 170.

As illustrated in FIG. 4, the support 143 includes a boss 143A that projects from the bottom 141B of the housing 141 toward the rear, and a stop 143B that is screwed into the boss 143A. The boss 143A is formed integrally with the bottom 141B. The boss 143A has a cylindrical shape with a flange 143AA at its front end. The boss 143A passes through through holes 142AA and 142BA, which will be described below, of the link member 142, and supports the link member 142 rotatably about the central axis of the boss 143A serving as the rotary axis S. The link member 142 is restricted by the stop 143B and the flange 143AA from moving in the front/rear direction.

As illustrated in FIGS. 2 to 4, the link member 142 is a bar member such as a bell crank, which serves as a link of the linkage. The link member 142 includes a first plate member 142A, which is located on the rear side, and a second plate member 142B, which is located on the front side, the first plate member 142A and the second plate member 142B being opposite each other in the front/rear direction. The link member 142 further includes an upper cylinder member 142C and a lower cylinder member 142D that are fitted and fixed in grooves formed in the plate members 142A and 142B.

As illustrated in FIG. 4, the first plate member 142A and the second plate member 142B have at their centers the through holes 142AA and 142BA that are circular in cross section, and through which the boss 143A of the support 143 passes.

As illustrated in FIGS. 2 to 4, the upper cylinder member 142C is located above the rotary axis S, and the lower cylinder member 142D is located below the rotary axis S. The upper and lower cylinder members 142C and 142D have a cylindrical shape that extends in the same direction as the rotary axis S, that is, in the front/rear direction. The balls 112 and 132 of the cables 110 and 130 are received in the upper cylinder member 142C, and the ball 122 of the cable 120 is received in the lower cylinder member 142D. Placing the balls in this manner is performed, for example, after the link member 142 has been assembled.

To allow the balls 112 and 132 of the cables 110 and 130 to be received in the upper cylinder member 142C, as illustrated in FIGS. 2 and 4, the first plate member 142A includes, at a first end thereof, a straight-line cut 142AB and a through hole 142AC that is circular in cross section, and which communicates with the cut 142AB and the inside of the upper cylinder member 142C. As illustrated in FIGS. 3 and 4, the upper cylinder member 142C further includes a cut 142CA that extends in the direction along the central axis and communicates with the cut 142AB. The upper cylinder member 142C further includes a cut 142CB at a rear side position and a cut 142CC at a front side position. The cut 142CB extends toward the right from the cut 142CA in the circumferential direction, and the cut 142CC extends toward the left from the cut 142CA in the circumferential direction. The cuts 142CB and 142CC may be of any length.

The ball 112 serving as the second end of the left hood lock cable 110 is inserted into the upper cylinder member 142C through the through hole 142AC of the first plate member 142A. At this time, the cable main component 111 which connects to the ball 112 is inserted into the cut 142CC through the cut 142AB of the first plate member 142A and the cut 142CA of the upper cylinder member 142C. As a result, the ball 112 is received in the upper cylinder member 142C with the cable main component 111 passing through the cut 142CC. As such, the second end of the left hood lock cable 110 is connected to an upper portion 142P of the link member 142 that is located above the rotary axis S, that is, closer to a first-end side of the link member 142 than the rotary axis S, where the upper cylinder member 142C is located.

After the left hood lock cable 110 has been connected, similarly to the ball 112, the ball 132 serving as the second end of the opener cable 130 is inserted into the upper cylinder member 142C through the through hole 142AC. Similarly to the cable main component 111, the cable main component 131 is inserted into the cut 142CB through the cut 142AB and the cut 142CA. As a result, the ball 132 is received in the upper cylinder member 142C with the cable main component 131 passing through the cut 142CB. As such, the second end of the opener cable 130 is connected to the upper portion 142P.

To allow the ball 122 of the cable 120 to be received in the lower cylinder member 142D, as illustrated in FIGS. 2 to 4, the first plate member 142A includes, at a second end thereof, a cut 142AD and a through hole 142AE that have shapes similar to those of the cut 142AB and the through hole 142AC, respectively. The lower cylinder member 142D has a shape similar to that of the upper cylinder member 142C and includes cuts 142DA, 142DB, and 142DC which respectively correspond to the cuts 142CA, 142CB, and 142CC of the upper cylinder member 142C. The cut 142DB is not illustrated. The lower cylinder member 142D is disposed in the opposite orientation to that of the upper cylinder member 142C, that is, in a manner such that the cut 142DA faces down. The cut 142DA communicates with the cut 142AD of the first plate member 142A, and the inside of the lower cylinder member 142D communicates with the through hole 142AE.

The ball 122 serving as the second end of the right hood lock cable 120 is inserted into the lower cylinder member 142D through the through hole 142AE of the first plate member 142A. At this time, the cable main component 121 which connects to the ball 122 is inserted into the cut 142DC through the cut 142AD of the first plate member 142A and the cut 142DA of the lower cylinder member 142D. As a result, the ball 122 is received in the lower cylinder member 142D with the cable main component 121 passing through the cut 142DC. As such, the second end of the right hood lock cable 120 is connected to a lower portion 142R of the link member 142 that is located below the rotary axis S, that is, closer to a second-end side of the link member 142 than the rotary axis S, where the lower cylinder member 142D is located. The lower portion 142R is located opposite the upper portion 142P with the rotary axis S therebetween.

As described above, the cut 141C is located on the left-hand side of the link member 142, and the cut 141F is located on the right-hand side of the link member 142. Therefore, the left hood lock cable 110 and the right hood lock cable 120 that respectively pass through the cuts 141C and 141F extend from the link member 142 toward opposite sides to each other. Further, the cut 141E is located on the right-hand side of the link member 142 and is opposite the cut 141C as viewed in the direction along the rotary axis S. Therefore, the opener cable 130 that passes through the cut 141E and the left hood lock cable 110 that passes through the cut 141C extend from the link member 142 toward opposite sides to each other, and the opener cable 130 and the right hood lock cable 120 extend from the link member 142 toward the same side. Further, the cut 141C and the cut 141E that are opposite each other as viewed in the direction along the rotary axis S have different depths, and the second ends of the opener cable 130 and the left hood lock cable 110 that pass through these cuts are shifted from each other in the direction along the rotary axis S and are connected to the same upper portion 142P as viewed in the direction along the rotary axis S.

Operation of the Actuation Cable Device 100

Figure 5:
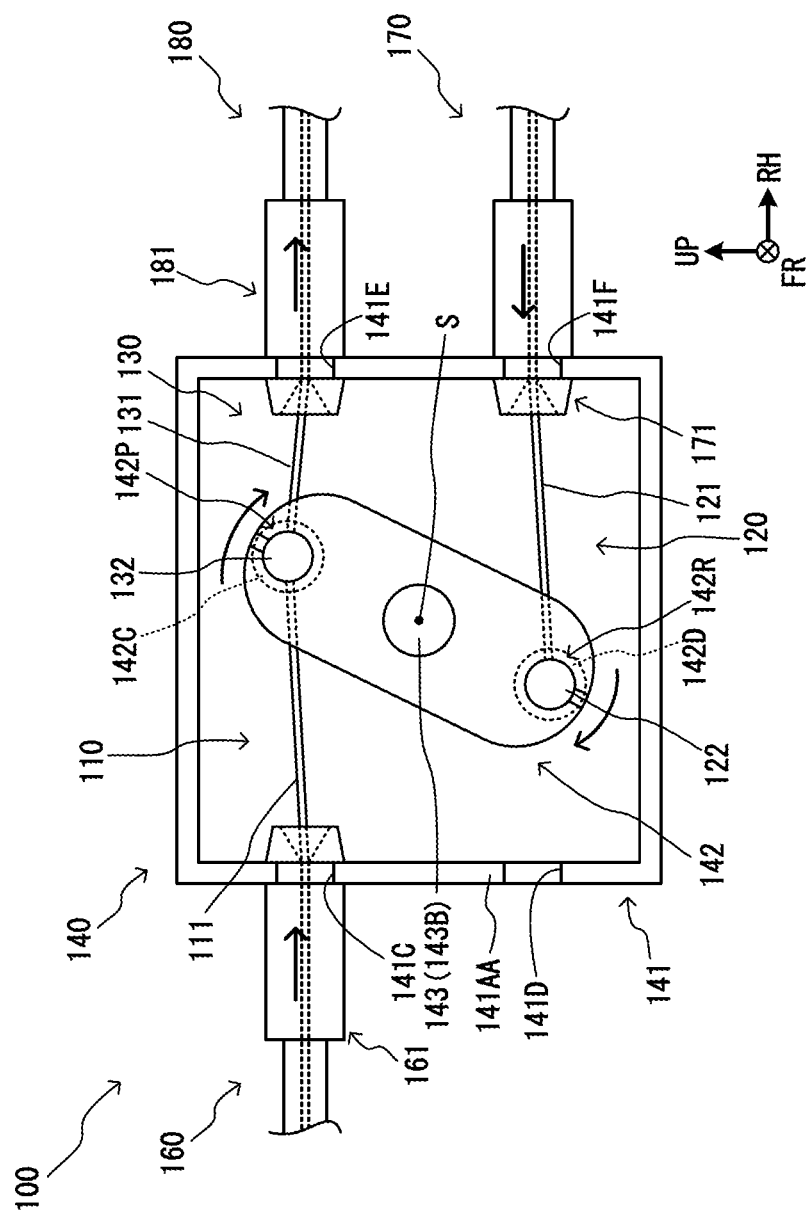
FIG. 5 illustrates a manner in which a link member rotates from an initial state of the actuation cable device illustrated in FIG. 1.

In response to a pulling operation of the hood opener 16 illustrated in FIG. 1, the actuation cable device 100 changes from the initial state illustrated in FIG. 2 to a state illustrated in FIG. 5.

Specifically, in response to a pulling operation of the hood opener 16 illustrated in FIG. 1, as illustrated in FIG. 5, the opener cable 130 connected to the hood opener 16 is pulled in conjunction with this pulling operation. This pulling action causes the link member 142 to rotate toward the right about the rotary axis S as the upper portion 142P of the link member 142 to which the opener cable 130 is connected is pulled.

As the link member 142 rotates, the left hood lock cable 110 is pulled in the same direction as the direction in which the opener cable 130 is pulled, because the left hood lock cable 110 connected to the upper portion 142P of the link member 142 extends from the link member 142 toward an opposite side to the side toward which the opener cable 130 extends. On the other hand, the right hood lock cable 120 connected to the lower portion 142R that is located opposite the upper portion 142P with the rotary axis S therebetween extends from the link member 142 toward an opposite side to the side toward which the left hood lock cable 110 extends, and toward the same side as the side toward which the opener cable 130 extends, and is pulled in the opposite direction to the direction in which the opener cable 130 is pulled. As such, the left hood lock cable 110 and the right hood lock cable 120 are respectively pulled in directions to be more apart from the left hood lock device 15A and the right hood lock device 15B illustrated in FIG. 1. These pulling actions cause a simultaneous actuation to pull the left hood lock device 15A and the right hood lock device 15B to release a hood lock. This release enables the engine hood 12 to be opened. A release of the pulling operation of the hood opener 16 causes the actuation cable device 100 to return to the initial state illustrated in FIG. 2.

Advantage 1 of the Actuation Cable Device 100

As described in the OPERATION OF THE ACTUATION CABLE DEVICE 100 section above, the actuation cable device 100 enables conversion of pulling of the opener cable 130 that occurs in response to a pulling operation of the hood opener 16 into pulling of the left hood lock cable 110 and the right hood lock cable 120 via the link member 142, and enables a simultaneous actuation of the left hood lock device 15A and the right hood lock device 15B to release a hood lock. The actuation cable device 100 includes the link member 142 for performing this conversion, and the link member 142 is not a member such as a pulley around which the cables 110, 120, and 130 are wound each time the hood opener 16 is operated. Therefore, the link member 142 can be downsized without reduction in durability performance that would occur due to winding of the cables 110, 120, and 130, and precludes upsizing. As such, the link device 140 and the actuation cable device 100 that includes the link member 142 can also be downsized, precluding upsizing of the overall device. Additionally, because the second ends of the opener cable 130 and the left hood lock cable 110 are connected to the same upper portion 142P as viewed in the direction along the rotary axis S, a pulling force exerted when the opener cable 130 is pulled is efficiently transmitted to the left hood lock cable 110.

While the cables 110, 120, and 130 may be made of an anticorrosive and high-strength material, the cables 110, 120, and 130 made of such a material resist being curved; therefore, a conventional device that incorporates a pulley requires upsizing of the pulley in order to satisfy durability performance and other requirements. As the use of the link member 142 as in the actuation cable device 100 eliminates the necessity for curving the cables 110, 120, and 130, the actuation cable device 100 can be downsized regardless of the material of the cables 110, 120, and 130. Additionally, because the cables 110, 120, and 130 are used in almost linear form, sliding loss is smaller than when a pulley is used. Further, while the use of a pulley requires a process of winding the cables 110, 120, and 130 around the pulley, the link member 142 eliminates the necessity for this process and enhances the ease of assembly of the actuation cable device 100.

Because the cable main components 111, 121, and 131 respectively pass through the cuts 142CB, 142CC, and 142DC which are included in the upper cylinder member 142C or the lower cylinder member 142D and which extend in the circumferential direction, when the link member 142 rotates, the balls 112, 122, and 132 rotate relative to the upper cylinder member 142C or the lower cylinder member 142D, and the cable main components 111, 121, and 131 can move in the cuts 142CB, 142CC, and 142DC, respectively. Therefore, a reduction in durability of the cable main components 111, 121, and 131 is avoided because unnecessary load is not applied to the cable main components 111, 121, and 131 when the link member 142 rotates. As described above, the link member 142 may include, at connection portions where the second ends of the cables 110, 120, and 130 are connected to the link member 142, cuts or through holes in which the cables 110, 120, and 130 can move when the link member 142 rotates.

Vehicle 10 with a Left-Hand Steering Wheel

Figure 6:
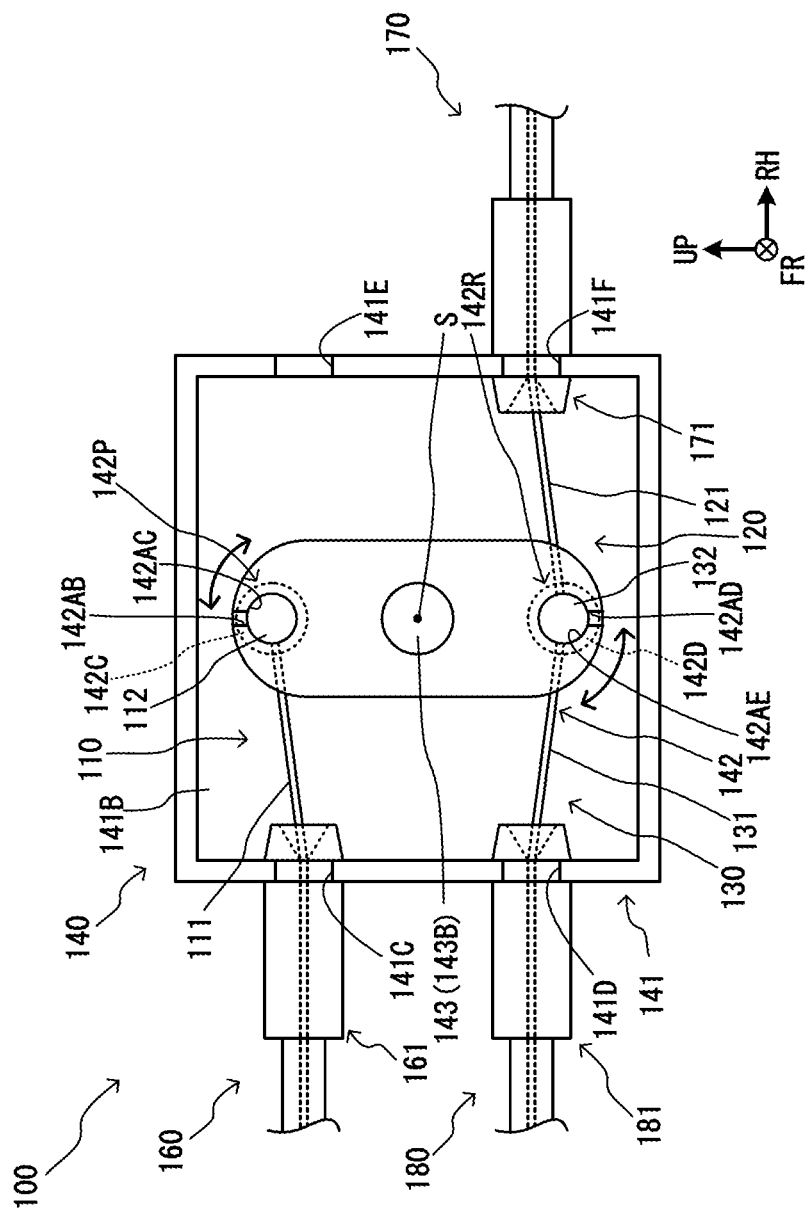
FIG. 6 is an elevation view illustrating a link device and its vicinity of the actuation cable device in a left-hand drive vehicle as viewed from the rear.

The actuation cable device 100 may also be mounted on a vehicle 10 that has a steering wheel on the left. In this embodiment, as illustrated in FIG. 6, the connection end 181 of the outer tube 180, through which the opener cable 130 passes, is fitted into the cut 141D of the housing 141 of the link device 140. Subsequent to the ball 122, the ball 132 of the opener cable 130 is inserted into the lower cylinder member 142D through the through hole 142AE of the first plate member 142A. At this time, the cable main component 131 which connects to the ball 132 is inserted into the cut 142DB through the cut 142AD of the first plate member 142A and the cut 142DA of the lower cylinder member 142D. As such, the ball 132 is received in the lower cylinder member 142D with the cable main component 121 passing through the cut 142DB. As such, the second end of the opener cable 130 is connected to the lower portion 142R. As described above, the cut 141D is located on the left-hand side of the link member 142, and the opener cable 130 extends from the link member 142 toward the same side as the side toward which the left hood lock cable 110 extends, and toward an opposite side to the side toward which the right hood lock cable 120 extends. The operation performed in response to a pulling operation of the hood opener 16 is similar to that in the above-described embodiment, except that the opener cable 130 is pulled toward the left.

Advantage 2 of the Actuation Cable Device 100

The actuation cable device 100 can be mounted on either a right-hand drive vehicle or a left-hand drive vehicle by simply changing connection portions where the connection end 181 of the outer tube 180 and the second end of the opener cable 130 are connected. As described above, the link device 140 may include a connection portion where the opener cable 130 can be connected in a manner so that it extends from the link member 142 toward an opposite side to the side toward which the left hood lock cable 110 extends, and a connection portion where the opener cable 130 can be connected in a manner so that it extends from the link member 142 toward an opposite side to the side toward which the right hood lock cable 120 extends. Further, in this embodiment, as the cuts 141C and 141F through which the left hood lock cable 110 and the right hood lock cable 120 respectively pass have greater depths than the cut 141D and 141E through which the opener cable 130 may pass, the second ends composed of the balls 112 and 122 of the cables 110 and 120 are connected to the link member 142 prior to the opener cable 130. As such, regardless of whether the steering wheel of the vehicle 10 is on the right or on the left, the actuation cable device 100 can be assembled by the same method up until the step of connecting the opener cable 130. As described above, the link device 140 may have a structure in which the second ends composed of the balls 112 and 122 of the cables 110 and 120 are connected prior to the second end of the opener cable 130. Additionally, while, as described above, the outer tube 180, through which the opener cable 130 passes, has a halfway portion held at the right hood lock device 15B, the left hood lock device 15A may also be configured to hold the outer tube 180. With this configuration, regardless of whether the vehicle 10 has a steering wheel on the right or on the left, the same devices can serve as the left hood lock device 15A and the right hood lock device 15B.

MODIFICATION EXAMPLE

The structure of the actuation cable device 100 can be modified as appropriate. For example, individual components included in the actuation cable device 100 are not limited to those having the above-described shapes, and may have any appropriate shape. As one specific example, the link member 142 may be composed of, for example, a bell crank that is bent as viewed in the direction along the rotary axis S. Further, the actuation cable device 100 may actuate other devices other than the left hood lock device 15A and the right hood lock device 15B. In this example, the devices to which the first ends of the cables 110, 120, and 130 are connected are changed. As described above, the actuation cable device 100 may be an actuation cable device for actuating a first device and a second device of a vehicle in conjunction with an operation of an operation device of the vehicle, the actuation cable device including a first cable having a first end that is connected to the first device; a second cable having a first end that is connected to the second device; a third cable having a first end that is connected to the operation device; and a link member that is rotatable about a rotary axis set at a center portion, wherein the first cable has a second end connected to a first portion of the link member that is located closer to a first-end side of the link member than the rotary axis, wherein the second cable has a second end connected to a second portion of the link member that is located closer to a second-end side of the link member than the rotary axis, the second portion being located opposite the first portion with the rotary axis therebetween, wherein the first cable and the second cable extend from the link member toward opposite sides to each other, wherein the third cable has a second end connected to a third portion of the link member that is located closer to the first-end side of the link member than the rotary axis, and wherein the third cable extends from the link member toward an opposite side to the side toward which the first cable extends. The first portion and the third portion may be the same portion as viewed in the direction along the rotary axis S, like the upper portion 142P in the above-described embodiment, or may be different portions. The first through third cables extend from the link member toward the above-described directions, and then may be curved toward different directions at halfway portions. The term opposite side encompasses an opposite direction other than 180 degrees. The first through third cables may be cables composed of wires.

For the vehicle 10 with a right-hand steering wheel, the left hood lock cable 110, the right hood lock cable 120, the opener cable 130, the upper portion 142P, and the lower portion 142R of the above-described embodiment respectively correspond to the first cable, the second cable, the third cable, the first portion and the third portion, and the second portion. For the vehicle 10 with a left-hand steering wheel, the left hood lock cable 110, the right hood lock cable 120, the opener cable 130, the upper portion 142P, and the lower portion 142R of the above-described embodiment respectively correspond to the second cable, the first cable, the third cable, the second portion, and the first portion and the third portion.

The invention claimed is:

1. An actuation cable device for actuating a first device and a second device of a vehicle in conjunction with an operation of an operation device of the vehicle, the actuation cable device comprising:
   a first cable having a first end that is connected to the first device;
   a second cable having a first end that is connected to the second device;
   a third cable having a first end that is connected to the operation device; and
   a link member that is rotatable about a rotary axis set at a center portion,
   wherein the first cable has a second end connected to a first portion of the link member that is located closer to a first-end side of the link member than the rotary axis,
   wherein the second cable has a second end connected to a second portion of the link member that is located closer to a second-end side of the link member than the rotary axis, the second portion being located opposite the first portion with the rotary axis therebetween,
   wherein the first cable and the second cable extend from the link member toward opposite sides to each other,
   wherein the third cable has a second end connected to a third portion of the link member that is located closer to the first-end side of the link member than the rotary axis, and
   wherein the third cable extends from the link member toward an opposite side to the side toward which the first cable extends.

* * * * *